(12) United States Patent
Fattal et al.

(10) Patent No.: US 8,842,265 B2
(45) Date of Patent: Sep. 23, 2014

(54) CONFIGURABLE GRATING BASED ON COLLAPSING NANO-FINGERS

(75) Inventors: David A. Fattal, Mountain View, CA (US); Raymond G. Beausoleil, Redmond, WA (US); Zhiyong Li, Foster City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 696 days.

(21) Appl. No.: 13/090,016

(22) Filed: Apr. 19, 2011

(65) Prior Publication Data

US 2012/0268736 A1 Oct. 25, 2012

(51) Int. Cl.
 *G01J 3/44* (2006.01)
 *B82Y 20/00* (2011.01)
 *G02B 5/18* (2006.01)
 *B29D 11/00* (2006.01)

(52) U.S. Cl.
 CPC ............... *B82Y 20/00* (2013.01); *G02B 5/1809* (2013.01); *G02B 5/1828* (2013.01); *B29D 11/0346* (2013.01); *B29D 11/0074* (2013.01)
 USPC .......................................... 356/73; 356/301

(58) Field of Classification Search
 CPC ... G02B 5/1828; G01N 21/658; G01N 21/554
 USPC .......................................... 359/573; 356/301
 See application file for complete search history.

(56) References Cited

U.S. PATENT DOCUMENTS

| | | | |
|---|---|---|---|
| 2007/0086001 A1* | 4/2007 | Islam et al. | 356/301 |
| 2008/0024776 A1* | 1/2008 | Bratkovski et al. | 356/301 |
| 2008/0095977 A1* | 4/2008 | Aizenberg et al. | 428/120 |
| 2008/0174775 A1* | 7/2008 | Moskovits et al. | 356/301 |
| 2009/0002701 A1* | 1/2009 | Fattal et al. | 356/301 |
| 2009/0214885 A1 | 8/2009 | Her | |
| 2010/0259823 A1 | 10/2010 | Xi | |
| 2011/0116089 A1* | 5/2011 | Schmidt et al. | 356/301 |
| 2012/0188540 A1* | 7/2012 | Bratkovski et al. | 356/301 |
| 2012/0212732 A1* | 8/2012 | Santori et al. | 356/301 |

FOREIGN PATENT DOCUMENTS

WO  WO-2008123996 A1  10/2008

OTHER PUBLICATIONS

M. F. Cansizoglu, et al. "High Optical Absorption of Indium Sulfide Nanorod Arrays Formed by Glancing Angle Deposition" (Research Paper), Arkansas, 72204, USA.
Riad Haidar, et al. "Free-standing Subwavelength Metallic Gratings for Snapshot Multispectral Imaging" (Research Paper), Applied Physics Letters, Published Jun. 2, 2010, pp. 221104-1-221104-3, vol. 96, USA.
Y.Q. Zhu, et al. "Collapsing Carbon Nanotubes and Diamond Formation Under Shock Waves" (Research Paper), Chemical Physics Letters, Published May 8, 1998, pp. 689-693, vol. 287, USA.

* cited by examiner

*Primary Examiner* — Kara E Geisel

(57) ABSTRACT

A configurable grating based on collapsing nano-fingers includes a substrate; and a plurality of bendable nano-fingers supported on the substrate. The nano-fingers may be formed in a regular first array and the nano-fingers may be formed in a spacing that, upon closing at their tops, forms a second array to act as an optical grating or a diagnostic tool. A method of fabricating a configurable optical grating based on collapsing nano-fingers is also disclosed, as well as a method of determining an open or closed state for a plurality of nano-fingers.

20 Claims, 6 Drawing Sheets

CONFIGURABLE GRATING BASED ON COLLAPSING NANO-FINGERS

BACKGROUND

Resonant effects in dielectric gratings were identified in the early 1990's as having promising applications to free-space optical filtering and sensing. Resonant effects typically occur in sub-wavelength gratings, where the first-order diffracted mode corresponds not to freely propagating light but to a guided wave trapped in some dielectric layer. When a high-index-contrast grating is used, the guided waves are rapidly scattered and do not propagate very far laterally. As a result, the resonant feature can be considerably broadband and of high angular tolerance, which has been used to design novel types of highly reflective mirrors. Recently, sub-wavelength grating mirrors have been used to replace the top dielectric stacks in vertical-cavity surface-emitting lasers, and in novel micro-electromechanical devices. In addition to being more compact and relatively cheaper to fabricate, sub-wavelength grating mirrors also provide polarization control.

Although in recent years there have been a number of advances in sub-wavelength gratings, designers, manufacturers, and users of optical systems continue to seek grating enhancements that broaden the possible range of grating applications. For example, liquid crystal cells are conveniently controllable with voltage, but cannot be made sub-wavelength in the optical domain.

DETAILED DESCRIPTION

Figure 1A:
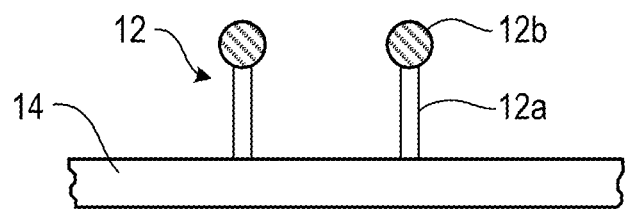
FIG. 1A is a side elevational view depicting a portion of nano-fingers in an open configuration, based on a tetragonal array, in accordance with an example.

Reference is made now in detail to specific examples, which illustrates the best mode presently contemplated by the inventors for practicing the invention. Alternative examples are also briefly described as applicable.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on. In addition, the term "light" refers to electromagnetic radiation with wavelengths in the visible and non-visible portions of the electromagnetic spectrum, including infrared and ultraviolet portions of the electromagnetic spectrum.

Surface Enhanced Raman spectroscopy (SERS) is a spectroscopic technique used in condensed matter physics and chemistry to study vibrational, rotational, and other low-frequency modes in molecular systems. In a Raman spectroscopic experiment, an approximately monochromatic beam of light of a particular wavelength range passes through a sample of molecules and a spectrum of scattered light is emitted. The spectrum of wavelengths emitted from the molecule is called a "Raman spectrum" and the emitted light is called "Raman scattered light." A Raman spectrum can reveal electronic, vibrational, and rotational energy levels of a molecule. Different molecules produce different Raman spectrums that can be used like a fingerprint to identify molecules and even determine the structure of molecules.

The Raman scattered light generated by a compound (or ion) adsorbed on or within a few nanometers of a structured metal surface can be $10^3$-$10^{14}$ times greater than the Raman scattered light generated by the same compound in solution or in the gas phase. In recent years, SERS has emerged as a routine and powerful tool for investigating molecular structures and characterizing interfacial and thin-film systems, and even enables single-molecule detection.

Recent improvements in forming the structured metal surface have led to the development of a new class of SERS structures that are based on nano-finger structures, comprising a plurality (at least two) of nanopoles or nanopillars that form teepees under certain conditions. Indeed, the nano-fingers (two, three, four, or more) tend to lean toward each other mainly driven by micro-capillary force when exposed to a liquid. The structure can be rationally designed according to the SERS requirement and can be mass fabricated with 3-D imprinting methods or roll-to-roll processes. An array of groups of nanopoles may provide improved sensitivity of the SERS sensor and is easily manufacturable.

In accordance with the teachings herein, a configurable grating based on collapsing nano-finger technology is provided. The grating can potentially be subwavelength, in which case it has no diffraction but its transmission/reflection properties can be altered. The finger collapsing can be controlled and may even be reversed in a number of ways described elsewhere, such as electrostatic, magnetic, mechanical, etc.

The description that follows is given first in terms of a configurable (or reconfigurable) sub-wavelength grating that may be used as an optical element. Secondly, the grating may be used as a diagnostic tool to determine whether the nano-fingers are in the collapsed state or are in the open state.

Optical Elements

A sub-wavelength grating may comprise a two-dimensional (2-D) array of cylindrical posts extending approximately perpendicular from the surface. The array is often referred to as a "lattice", and the arrangement may be tetragonal or hexagonal, as shown in the Figures described below, or other regular array. For example, a hexagonal lattice of posts is characterized by an equilateral triangular unit cell with a lattice constant, denoted by $\Lambda$, that corresponds to the distance between the centers of any pair of adjacent posts. In general, any regular array of nano-fingers may be employed, although the most relevant for a switch may be a square or rectangular configuration, since it clearly defines two orthogonal polarization axes.

Figure 1B:
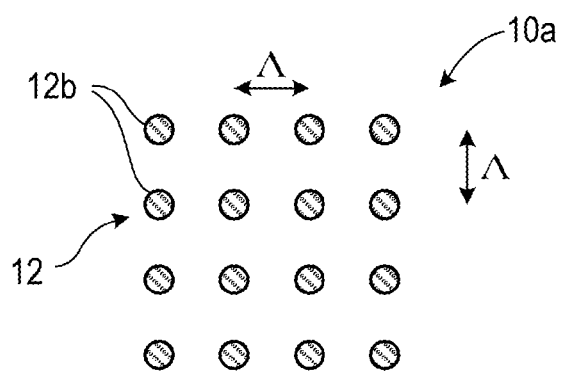
FIG. 1B is a top plan view depicting an array of the nano-fingers of FIG. 1A in the open configuration, with a period of $\Lambda$ in both the x- and y-directions between nano-fingers (here, called monomers).

Referring to FIGS. 1-2, a square array 10a of nano-fingers 12 on a substrate 14 is shown. In FIGS. 1A-1B, the nano-fingers 12 are shown in an open position.

The nano-fingers 12 may be made of a resist stem 12a with a metallic top 12b, but other materials may also be used, such as silicon nano-fingers, with or without a metal tip. In one example, if the intended use of the grating is as an optical grating, then a semiconductor or polymer (e.g., resist) may be employed for the stem 12a. In another example, if the intended use of the grating is as a diagnostic tool (discussed in greater detail below), then a material having a high index for reflection, such as a metal, may be employed for the stem 12a.

Fabrication of the stems 12a (and tops 12b) may be accomplished by any number of techniques, such as conventional or advanced photolithography, embossing technique, roll-to-roll technique, nano-imprinting (where the stems 12a are of a polymer material); chemical vapor deposition (CVD) followed by patterned etching; solid-liquid-vapor growth; or various template-assisted fabrication techniques, for example, an oxide template is formed, followed by an electrochemical etch, backfilling of holes, polishing to remove excess metal, and etching to remove sacrificial oxide (e.g., alumina) (where the stems are of an inorganic material).

The substrate 14 generally comprises any reasonably suitable material to support the nano-fingers 12, such as glass, plastic, polymer, metal, etc. The nano-fingers 12 may be attached to the surface of the substrate 14 through any suitable attachment mechanism. For instance, the nano-fingers 12 may be grown directly on the substrate 14 surface through use of various suitable nano-structure growing techniques. As another example, the nano-fingers 12 may be integrally formed with the substrate 14. In this example, for instance, a portion of the material from which the substrate 14 is fabricated may be etched or otherwise processed to form the nano-fingers 12. In a further example, a separate layer of material may be adhered to the substrate 14 surface and the separate layer of material may be etched or otherwise processed to form the nano-fingers 12.

The nano-fingers 12 are formed of a relatively flexible material to enable the nano-fingers to be laterally bendable, for instance, to enable free ends of the nano-fingers to move toward each other, as discussed in greater detail herein below. Examples of suitable materials for the nano-fingers 12 may include polymer materials, such as polydimethylsiloxane (PDMS) elastomer, polyimide, polyethylene, polypropelene, etc., or any combination of thereof, metallic materials, such as gold, silver, aluminum, etc., semiconductor materials, etc., and combinations thereof. In various examples, the nano-fingers 12 may be fabricated through a nanoimprinting or embossing process in which a template of relatively rigid pillars is employed in a multi-step imprinting process on a polymer matrix to form the nano-fingers 12. Various other processes, such as etching, and various techniques used in the fabrication of micro-electromechanical systems (MEMS) and nano-electromechanical systems (NEMS) may also be used to fabricate the nano-fingers 12.

A nano-finger 12 may be defined as an elongated, nanoscale structure having a length (or height) that exceeds by more than several times a nanoscale cross sectional dimension (for instance, width) taken in a plane perpendicular to the length (for instance, length>3×width). In general, the length is much greater than the width or cross sectional dimension to facilitate bending of the nano-finger 12 laterally toward one or more neighboring nano-fingers. In some examples, the length exceeds the cross sectional dimension (or width) by more than a factor of about 5 or 10. For example, the width may be about 100 nanometers (nm) and the height may be about 500 nm. In another example, the width at the base of the nano-finger 12 may range between about 20 nm and about 300 nm and the length may be more than about 1 micrometer (μm). In other examples, the nano-finger 12 may be sized based upon the types of materials used to form the nano-finger. Thus, for instance, the more rigid the material(s) used to form the nano-finger 12, the less the width of the nano-finger may be to enable the nano-finger to be laterally collapsible. In further examples, the nano-finger 12 may form ridges in which two of three dimensions (for instance length and height) exceed by more than several times a nanoscale cross sectional dimension (for instance, width). According to particular examples, the heights of the nano-fingers 12 may be in the range of about 50 nm to 2 μm and their diameter may be in the range of about 10 nm to 1 μm. In addition, the nano-fingers 12 may equivalently be referenced as nanopoles or nanopillars without departing from a scope of the arrays discussed herein.

In any regard, and as discussed in greater detail herein below, the nano-fingers 12 in each of the clusters (e.g., 20 in FIG. 2B, 30 in FIG. 3B, 40 in FIG. 4A, 40' in FIG. 4B) are arranged with respect to each other such that the free ends of at least two neighboring nano-fingers 12 are able to touch each other when the nano-fingers are in a bent condition. By way of particular example, the neighboring nano-fingers 12 are positioned less than about 100 nanometers apart from each other.

The nano-fingers 12 are depicted in the Figures as having substantially cylindrical cross-sections. It should, however, be understood that the nano-fingers 12 may have other shaped cross-sections, such as, for instance, rectangular, square, triangular, etc. In addition, or alternatively, the nano-fingers 12 may be formed with one or more features, such as, notches, bulges, etc., to substantially cause the nano-fingers 12 to be inclined to bend in a particular direction. Thus, for instance, two or more adjacent nano-fingers 12 may include the one or more features to increase the likelihood of the free ends of these nano-fingers 104 to bend toward each other.

Although the nano-fingers 12 have been depicted in FIG. 1A as each extending vertically and at the same heights with respect to each other, it should be understood that some or all of the nano-fingers 12 may extend at various angles and heights with respect to each other. The differences in angles and/or heights between the nano-fingers 12 may be based upon, for instance, differences arising from manufacturing or growth variances existent in the fabrication of the nano-fingers.

Although not shown in the Figures, the nano-fingers 12 may initially be in a first position, in which their free ends are in a substantially spaced arrangement with respect to each other. The gaps between the free ends may be of sufficiently large size to enable a liquid to be supplied in the gaps. In addition, the gaps may be of sufficiently small size to enable the free ends of the nano-fingers 12 in each of the clusters (e.g., 20 in FIG. 2B) to move toward each other as the liquid evaporates, through, for instance, capillary forces applied on the free ends as the liquid dries. Other non-limiting examples, such as e-beam, ion-beam, magnetic, mechanical force, thermal effect, or electric charge effect, may also be utilized to cause the ends of the nano-fingers 12 to move toward each other. In addition, the tips of the nano-fingers 12 in each of the clusters (e.g., 20 in FIG. 2B) may contact each other and remain in contact with each other through van der Waals between those elements.

Figure 1C:
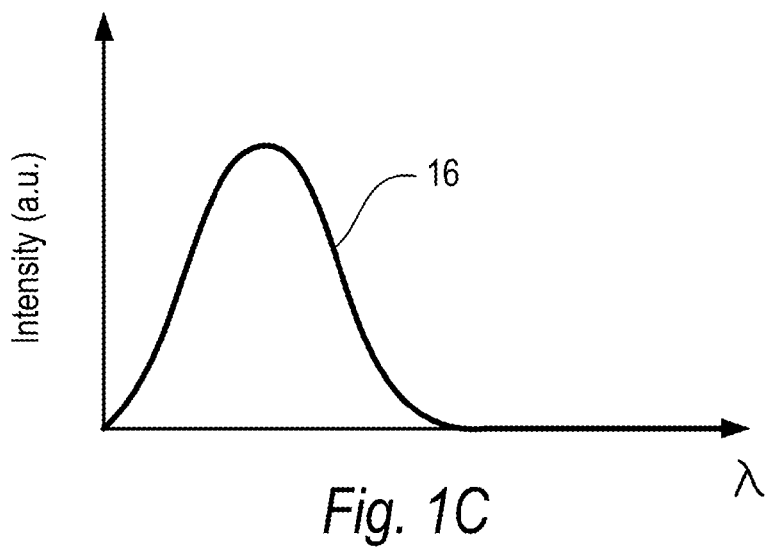
FIG. 1C, on coordinates of wavelength $\lambda$ and reflection intensity, is a representative plot of the reflection spectrum of the monomer configuration depicted in FIG. 1B.

As shown in FIG. 1B, the array 10a has period Λ, and may exhibit a certain reflection/transmission/absorption/diffraction spectrum, such as depicted in FIG. 1C. For example, a representative reflection spectrum 16 may exhibit a peak in intensity as a function of wavelength λ.

Figure 2A:
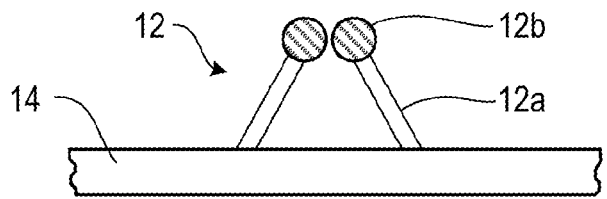
FIG. 2A is a side elevational view depicting a portion of nano-fingers in a closed configuration, based on an initial tetragonal array, in accordance with an example.
Figure 2B:
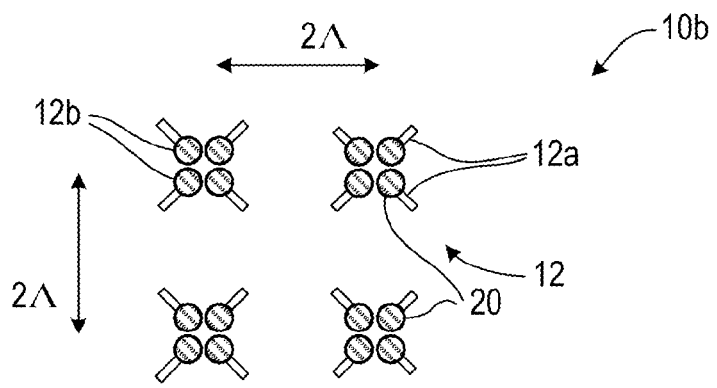
FIG. 2B is a top plan view depicting an array of the nano-fingers of FIG. 2A in the closed configuration, with a period of $2\Lambda$ in both the x- and y-directions between nano-fingers (here, called tetramers, due to the four-unit configuration).
Figure 3A:
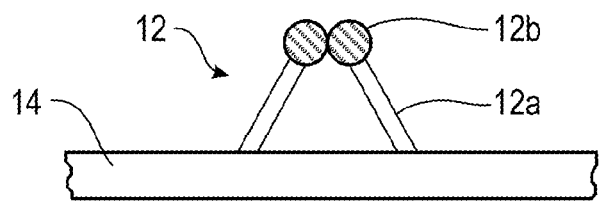
FIG. 3A is a side elevational view depicting a portion of nano-fingers in a closed configuration, based on an initial tetragonal array, in accordance with an example.
Figure 3B:
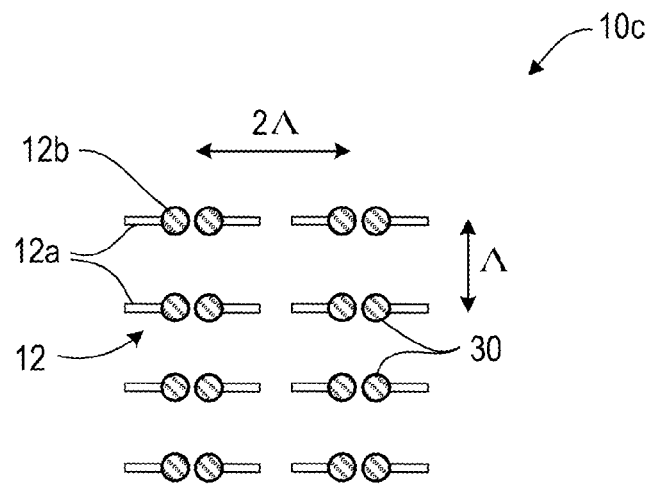
FIG. 3B is a top plan view depicting an array of the nano-fingers of FIG. 3A in the closed configuration, with a period of $2\Lambda$ in the x-direction and a period of $\Lambda$ in the y-direction between nano-fingers (here, called dimers), in which the square symmetry of FIG. 2B is broken.

The nano-fingers may be collapsed, or closed, as shown in FIGS. 2A and 3A, to form clusters, either called "tetramers" 20 (FIG. 2A), each comprising four nano-fingers 12 touching at their tops, or called "dimers" 30 (FIG. 3A), each comprising two nano-fingers 12 touching at their tops. The nano-fingers may be collapsed in a variety of ways, including exposing the device to a liquid. Other mechanisms to close and open the nano-fingers 12 may be employed as well, such as via a microcapillary force, electromechanical force, magnetic field, electric attraction/repulsion, thermal expansion/contraction (bi-metal), and the like, as described above. The array 10a, 10b, 10c may be repeatably reconfigurable, or configure once.

Figure 2C:
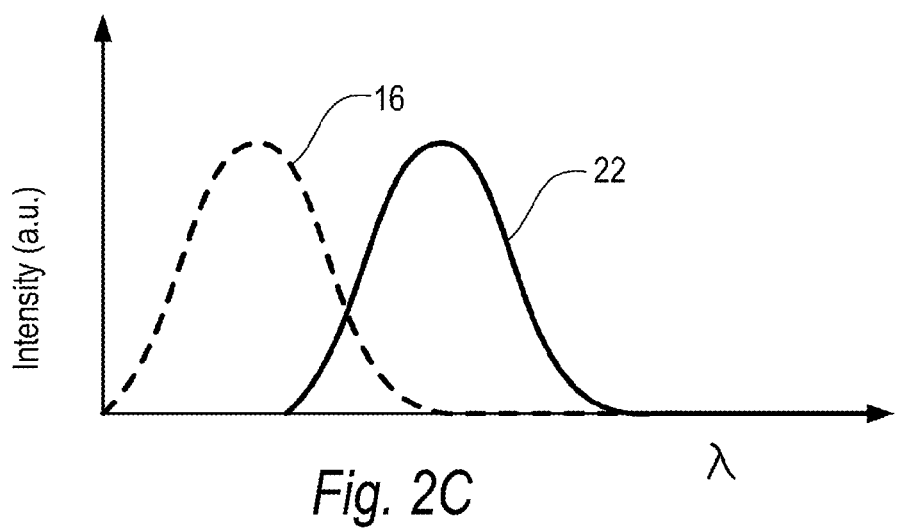
FIG. 2C, on coordinates of wavelength $\lambda$ and reflection intensity, is a representative plot of the reflection spectrum of the tetramer configuration depicted in FIG. 2B, showing a shift in wavelength.

After collapsing, or closing, the nano-fingers cluster in a predictive way, either tetramers 20 or dimers 30. In the tetramer case (FIG. 2A), the new structure (array 10b) retains the square symmetry but has changed its spatial period to 2Λ, which drastically alters its reflection/transmission/absorption/diffraction spectrum, as shown in FIG. 2C. The intensity curve 22 is essentially the same as curve 16 in FIG. 1C, but shifted in wavelength.

Figure 3C:
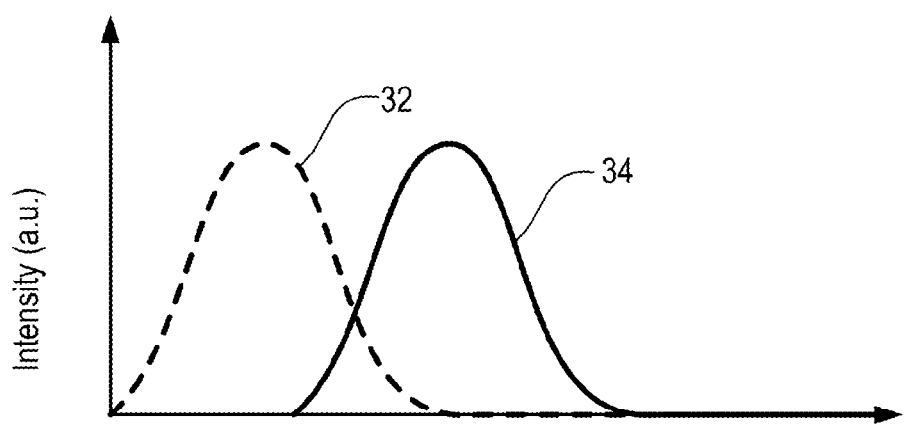
FIG. 3C, on coordinates of wavelength $\lambda$ and reflection intensity, is a plot of the reflection spectrum of the dimer configuration, showing two curves, depending on the polarization direction of the wavelength.

When the nano-fingers form dimers, the square symmetry of the original array is broken, and the spectrum becomes polarization-sensitive at normal incidence (FIG. 3C). Thus, at one polarization (parallel to the Λ spacing), curve 32 is obtained, while at the orthogonal polarization (parallel to the 2Λ spacing), curve 34 is obtained.

Combined with a way to reverse the collapse, as described above, a reconfigurable grating may be achieved. The collapse may be reversed by one of the techniques described above.

Whether the tetramer configuration 10b or the dimer configuration 10c is obtained may depend on the initial spacing of the nano-fingers 12. The tetramer configuration 10b may be obtained with smaller spacings, while the dimer configuration 10c may be obtained with larger spacings. Simple experimentation may be used to determine the particular spacing values for a given case.

Once a spacing value has been determined, then the pattern determined for that spacing may be achieved, and in a reconfigurable device, may be repeatably achieved. If the spacing of the nano-fingers 12 is intermediate between the two configurations, then a mixture of the two configurations, tetramer 10b and dimer 10c, may be obtained, which is determinable by an intensity vs. wavelength spectrum.

Without subscribing to any particular theory, it appears that the main driving force to collapse the fingers is a microcapillary force, where the liquid meniscus formed between the nearest neighboring fingers will pull the fingers toward each other. Because the distance between the nearest neighbors can be designed to be larger than the second nearest neighbor or third, etc, therefore, only the nearest neighboring fingers are pulled together controllably. This mechanism is one convenient way to induce the collapsing of the fingers. However, there are other means, such as electrostatic, magnetic, e-beam, i-beam, thermal, or mechanical vibration or even the use of bi-thermal materials, that can also be used to induce the finger closing in dry environment.

Figure 4A:
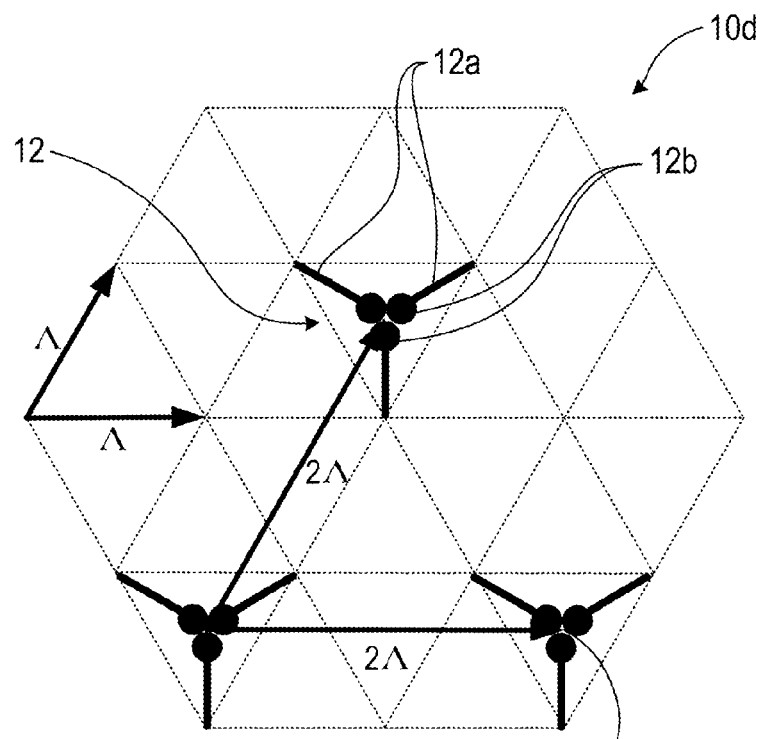
FIG. 4A is a top plan view depicting an array of nano-fingers in a closed configuration, based on an initial hexagonal array, with a period of $2\Lambda$ in the principle axes of the array, forming a trigomer configuration.
Figure 4B:
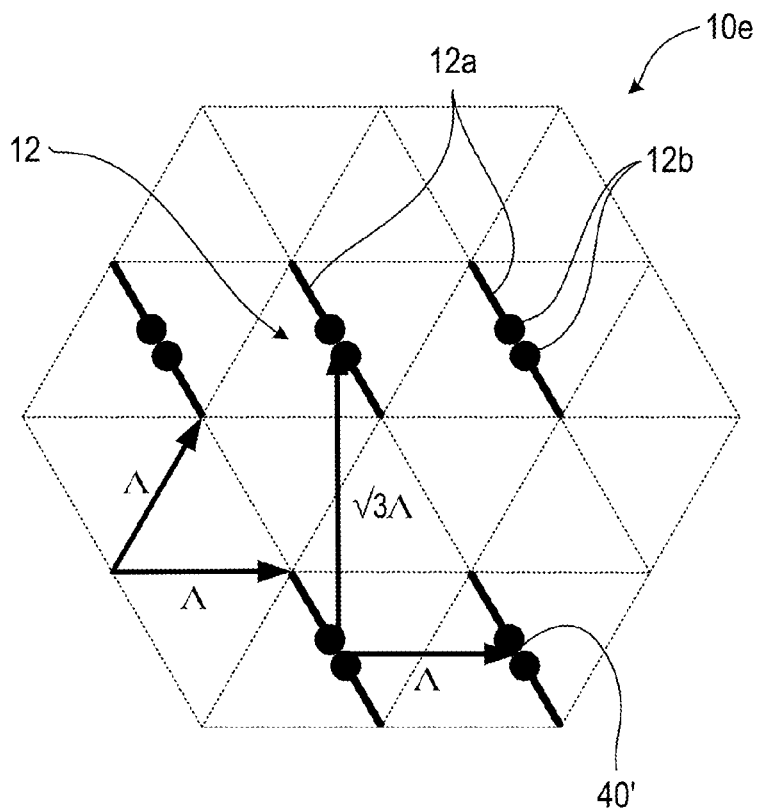
FIG. 4B is a top plan view depicting an array of nano-fingers, also based on an initial hexagonal array, but with a period of $\Lambda$ in the x-direction and a period of $\sqrt{3}\Lambda$ in the orthogonal-direction, forming a dimer configuration.

Turning now to FIGS. 4A and 4B, both Figures depict the collapsed, or closed, position for nano-fingers 12 in a hexagonal configuration (the light hexagonal grid lines are shown for convenience). FIG. 4A is analogous to the symmetrical closed position of FIG. 2B, while FIG. 4B is analogous to the less symmetrical closed position of FIG. 3B.

In FIG. 4A, the closed nano-fingers form clusters called "trigomers" 40, each comprising three nano-fingers 12 touching at their tops. In FIG. 4B, the closed nano-fingers form clusters called "dimers" 40', each comprising two nano-fingers 12 touching at their tops. As above, the nano-fingers may be collapsed in a variety of ways, including exposing the device to a liquid. Other mechanisms to close and open the nano-fingers 12 may be employed as well, such as via a microcapillary force, electromechanical force, magnetic field, electric attraction/repulsion, thermal expansion/contraction (bi-metal), and the like, as described above. The array 10a, 10b, 10c may be repeatably reconfigurable, or configure once.

After collapsing, or closing, the nano-fingers form clusters in a predictive way, either trigomer clusters 40 or dimer clusters 40'. In the trigomer case (FIG. 4A), the new structure (array 10d) retains the trigonal symmetry but has changed its spatial period from Λ to 2Λ, which drastically alters its reflection/transmission/absorption/diffraction spectrum, similar to what is depicted in FIG. 2C.

When the nano-fingers form dimers (FIG. 4B), the trigonal symmetry of the original array is broken to form a less symmetrical structure (array 10e). It is seen that the spatial period Λ remains the same in one direction and is √3Λ in the orthogonal direction, and the spectrum is polarization-sensitive at normal incidence, similar to what is depicted in FIG. 3C.

An advantage over prior art gratings is the possibility to realize subwavelength dimensions, and potentially to use high index material (e.g., silicon or III-V semiconductor material, which has an index of refraction of 3.8 to 4.5, or metal) for the grating pattern, giving much greater flexibility on the grating design.

As an example, a subwavelength grating (SWG) comprising a tetramer configuration 10b or dimer configuration 10c may be a high-contrast SWG because of the relatively high contrast between the refractive index of the material comprising the SWG 10b, 10c and the refractive index of the substrate 14, which can be created by forming the nano-fingers 12 so that portions of the substrate are exposed between the nano-fingers. For example, the elemental semiconductors (Si, Ge) and many III-V compound semiconductors that can be used to form the SWG 10b, 10c have effective refractive indices greater than approximately 3.5 when interacting with light of a wavelength 632.8 nm. By contrast, quartz, $SiO_2$, and polyacrylate used to form the substrate 14 have effective refractive indices less than approximately 1.55 when interacting with light of the same wavelength 632.8 nm. Similar considerations obtain for the trigonal configuration 10d and related dimer configuration 10e.

The lattice constant $\Lambda$ of the SWG 10b, 10c may be selected so that the optical element does not scatter light into the substrate into unwanted diffraction orders. Unwanted scattering can be prevented by selecting the lattice constant based on a no-scattering limit given by:

$$\Lambda < \lambda/n_s$$

for a square array or:

$$\Lambda < \frac{2}{\sqrt{3}} \frac{\lambda}{n_s}$$

for a hexagonal array, where $n_s$ is the refractive index of the substrate 14.

Uses of the optical element disclosed herein include optical filters, reflective displays, mirrors with a configurable reflectivity, and others.

Other applications for the optical element disclosed herein include in displays. Currently, liquid crystals that change configuration with an electric field are employed. The time to change configuration, however is limited by the time required for the polymers used in the LC display to re-align with the new field direction. The optical element disclosed herein does not suffer from such a limitation, and thus would provide a faster display.

In some examples, the formation of hybrid nanostructures may be permanent and may rely on van der Waals interactions to hold the nano-fingers 12 together at their tips 12a (analogous to a 'write-once' memory). In other examples, the formation of the hybrid nanostructures may be reversible. For example, using a repelling electromagnetic force, mechanical force, or electric charge may open the nano-finger tips 12s back up, such that the nano-fingers 12 revert to their original vertical, free-standing state (analogous to a 're-writable' memory).

Figure 5:
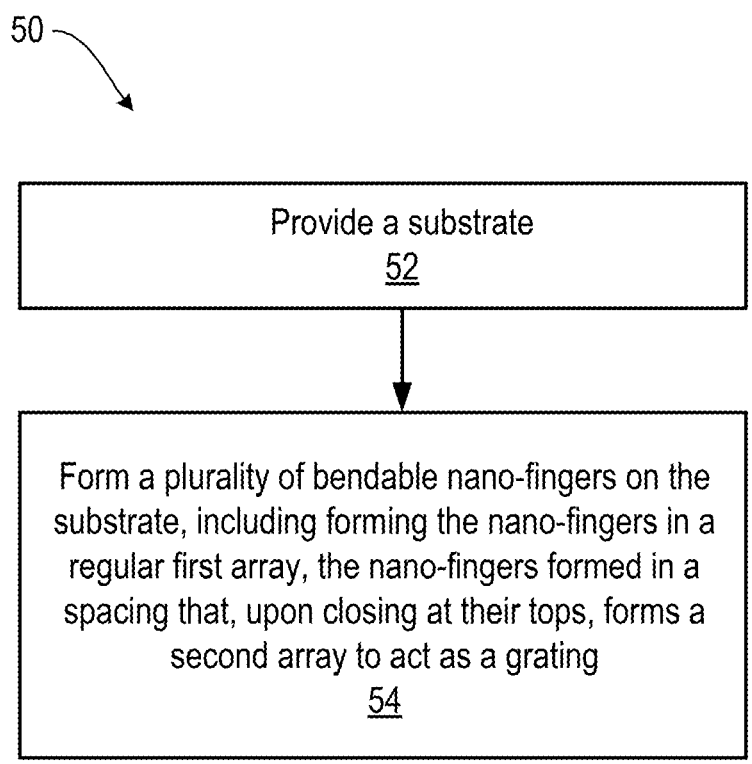
FIG. 5 is a flow diagram of a method for fabricating an optical element, namely, a configurable or reconfigurable grating, in accordance with an example.

Turning now to FIG. 5, there is shown a flow diagram of a method 50 for fabricating an optical element, namely, a configurable or reconfigurable grating, according to an example. It should be understood that the method 50 may include additional processes and that some of the processes described herein may be removed and/or modified without departing from a scope of the method. In addition, although particular reference is made herein to the array 10a, 10b, 10c in implementing the method 50, it should be understood that the method may be implemented through use of a differently configured apparatus without departing from a scope of the method.

At block 52, a substrate 14 is provided. The substrate 14 may comprise any of the materials as discussed above.

At block 54, a plurality of bendable nano-fingers 12 is formed on the substrate 14 in a predetermined arrangement, in which the nano-fingers are arranged in regular first array 10. The nano-fingers 12 are formed in a spacing that, upon closing their tops, forms a second array to act as a grating. According to an example, a nanoimprinting technique or a roll-to-roll process may be implemented to form the nano-fingers 12 on the substrate 14. In this example, a template may be formed through photolithography or other advanced lithography with the desired patterning to arrange the nano-fingers 12 in a regular first array. More particularly, for instance, the desired patterns may be designed on a mold, by E-beam lithography, photolithography, laser interference lithography, FIB (Focused Ion Beam), self-assembly of spheres, etc. In addition, the pattern may be transferred onto silicon, glass, or polymer substrate (PDMS, polyimide, polycarbonate, etc.). In other examples, the nano-fingers 12 may be formed in the predetermined arrangement through implementation of any suitable fabrication process.

Diagnostic Tool

Referring to FIGS. 1C and 2C, it has been discussed above that the intensity spectrum has shifted as a function of changing from the open position (all nano-fingers standing upright) to the closed position (nano-fingers clustered in groups of four).

Currently, determination of whether the nano-fingers have closed or not is based on SEM (scanning electron microscope) images. This can be a tedious and time-consuming effort, and would be difficult to accomplish in a lab or work environment. On the other hand, running a quick spectrum analysis (reflection/transmission/absorption/diffraction spectrum) can readily determine the state of the nano-fingers. One may run such a spectrum analysis at the beginning to obtain an initial "set-point" and then compare a subsequent analysis with the initial set-point to determine if the nano-fingers have indeed closed. The wavelength value of the peak intensity at the set-point is measured, providing $\lambda_1$. From the wavelength equations:

$$\lambda_{res} = \Lambda/n_{eff}$$

at normal incidence, it is possible to determine the value of $\lambda_2$, the expected location of the peak intensity in the closed position. However, defects can partially destroy the grating, or some nano-fingers 12 might not close, thereby generating a curve having a peak intensity between $\lambda_1$ and $\lambda_2$. Similar considerations obtain for the open-closed state of the hexagonal configuration.

Thus, a simple measurement of wavelength versus intensity in the open state and in the closed state may readily show whether all the nano-fingers 12 have indeed closed, without resorting to SEM images.

Figure 6:
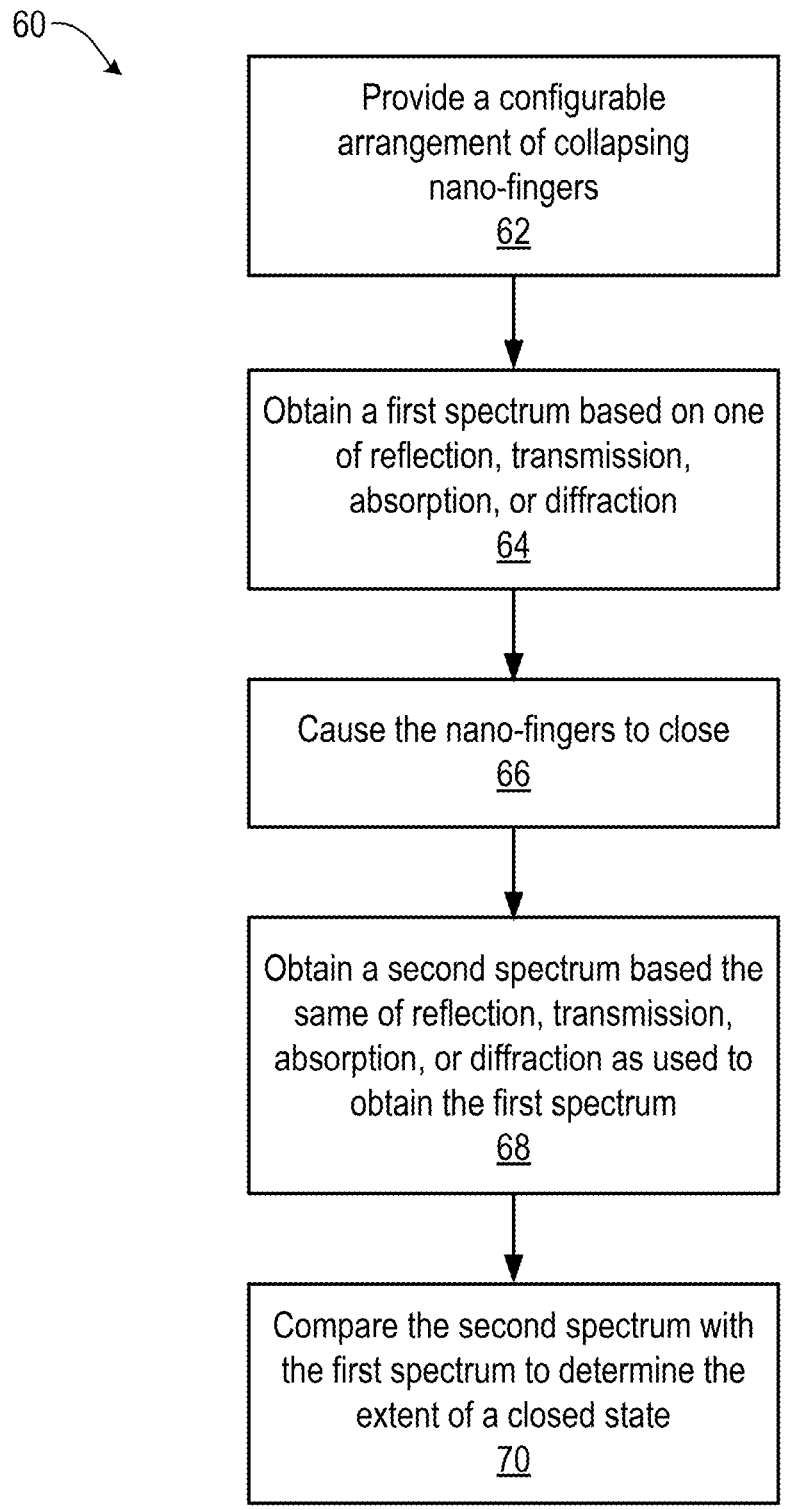
FIG. 6 is a flow diagram of a method for determining an open state or a closed state for a plurality of nano-fingers, in accordance with an example.

FIG. 6 is a flow diagram of a method 60 for determining an open state or a closed state for a plurality of nano-fingers 12.

At block 62 a configurable arrangement of collapsing nano-fingers is provided. As described above, the arrangement comprises a substrate and a plurality of bendable nano-fingers supported on the substrate, in which the nano-fingers are formed in a regular first array. The nano-fingers are formed in a spacing that, upon closing at their tops, forms a second array.

At block 64, a first spectrum based on one of reflection, transmission, absorption, or diffraction is obtained. A suitable apparatus may comprise a source of light incident on the arrangement of nano-fingers and a detector to receive reflected/transmitted/absorbed/diffracted light, such as is commonly employed in SERS analysis, along with appropriate optical elements for collimating, focusing, etc. the light.

At block 66, the nano-fingers are caused to close. This may be done by introducing a liquid to the nano-fingers or by use of one of the many techniques described above to cause closure.

At block 68, a second spectrum is obtained, conveniently using the same apparatus as described in block 64.

At block 70, the second spectrum is compared with the first spectrum to determine the extent of a closed state.

While the disclosure has been described with reference to certain examples, those skilled in the art will appreciate that various modifications, changes, omissions, and substitutions can be made without departing from the spirit of the disclosure.

What is claimed is:

1. A diagnostic tool including:
    a substrate;
    a plurality of bendable nano-fingers supported on the substrate, the nano-fingers formed in a regular first array in an open state, the nano-fingers formed in a spacing that, upon closing at their tops, forms a second array; and
    a spectrum analyzer configured to:
    obtain a first spectrum when the nano-particles are formed in the first regular array;
    obtain a second spectrum when the nano-particles are formed in the second array; and
    determine an extent of a closed state of the nano-fingers based on a difference between the first spectrum obtained when the nano-particles are formed in the regular first array and the second spectrum obtained when the nano-particles are formed in the second array.

2. The diagnostic tool of claim 1 in which the nano-fingers are configured to be repeatedly opened and closed to form a reconfigurable grating.

3. The diagnostic tool of claim 1 wherein in the open state, the regular first array comprises the nano-fingers in a tetragonal configuration having a period given by $\Lambda$ and in a closed state, the second array comprises the nano-fingers in a tetramer configuration having a period given by $2\Lambda$.

4. The diagnostic tool of claim 1, wherein in the open state, the regular first array comprises the nano-fingers in a tetragonal configuration having a period given by $\Lambda$ and in a closed state, the second array comprises the nano-fingers in a dimer configuration having a period in one direction given by $2\Lambda$ and a period in an orthogonal direction given by $\Lambda$.

5. The diagnostic tool of claim 1 wherein in the open state, the regular first array comprises the nano-fingers in a hexagonal configuration having a period given by $\Lambda$ and in a closed state, the second array comprises the nano-fingers in a trigonal configuration having a period given by $2\Lambda$.

6. The diagnostic tool of claim 1, wherein in the open state, the nano-fingers are in a hexagonal configuration having a period given by $\Lambda$ and in a closed state, the nano-fingers are in a dimer configuration having a period in one direction given by $\Lambda$ and a period in an orthogonal direction given by $\sqrt{3}\,\Lambda$.

7. The diagnostic tool of claim 1 wherein each of the bendable nano-fingers comprise a stem comprising a material selected from the group consisting of silicon, III-V semiconductor materials, and metals.

8. The diagnostic tool of claim 7 in which each of the nano-fingers comprise a tip.

9. The diagnostic tool of claim 8 wherein each tip comprises a metal.

10. A method of fabricating a configurable optical grating based on collapsing nano-fingers comprising:
    providing a substrate;
    forming a plurality of bendable nano-fingers on the substrate, including forming the nano-fingers in a regular first array, the nano-fingers formed in a spacing that, upon closing at their tops, form a second array to act as an optical grating,
    the optical grating configured to indicate an extent of a closed state of the nano-fingers, the extent of the closed state to be determined based on a difference between a first spectrum obtained when the nano-particles are formed in the regular first array and a second spectrum obtained when the nano-particles are formed in the second array.

11. The method of claim 10 in which the nano-fingers are configured to be repeatedly opened and closed to form a reconfigurable grating.

12. The method of claim 10 wherein the regular first array comprises nano-fingers in an open state formed in a tetragonal configuration having a period given by $\Lambda$ and the second array comprises nano-fingers in a closed state formed in a tetramer configuration having a period given by $2\Lambda$.

13. The method of claim 10, wherein the regular first array comprises nano-fingers in an open state formed in a tetragonal configuration having a period given by $\Lambda$ and the second array comprises nano-fingers in a closed state formed in a dimer configuration having a period in one direction given by $2\Lambda$ and a period in an orthogonal direction given by $\Lambda$.

14. The method of claim 10 wherein the regular first array comprises nano-fingers in an open state formed in a hexagonal configuration having a period given by $\Lambda$ and the second array comprises nano-fingers in a closed state formed in a trigonal configuration having a period given by $2\Lambda$.

15. The method of claim 10, wherein in an open state, the nano-fingers are in a hexagonal configuration having a period given by $\Lambda$ and the second array comprises nano-fingers in a closed state formed in a dimer configuration having a period in one direction given by $\Lambda$ and a period in an orthogonal direction given by $\sqrt{3}\,\Lambda$.

16. The method of claim 10 wherein each of the bendable nano-fingers comprise a stem comprising a material selected from the group consisting of silicon, III-V semiconductor materials, and metals.

17. The method of claim 16 in which each of the nano-fingers are provided with a tip.

18. The method of claim 17 wherein each of the tips comprise a metal.

19. A method of determining an open or closed state for a plurality of nano-fingers comprising:
    providing a configurable grating based on collapsing nano-fingers including:
        a substrate, and
        a plurality of bendable nano-fingers supported on the substrate, the nano-fingers formed in a regular first array, the nano-fingers formed in a spacing that, upon closing at their tops, forms a second array;
    obtaining a first spectrum based on one of reflection, transmission, absorption, or diffraction;
    causing the nano-fingers to close;
    obtaining a second spectrum based on the same of reflection, transmission, absorption, or diffraction as used to obtain the first spectrum; and
    comparing the second spectrum with the first spectrum to determine the extent of a closed state.

20. The method of claim 19, wherein the grating is reconfigurable.

* * * * *

UNITED STATES PATENT AND TRADEMARK OFFICE
CERTIFICATE OF CORRECTION

| | | |
|---|---|---|
| PATENT NO. | : 8,842,265 B2 | Page 1 of 1 |
| APPLICATION NO. | : 13/090016 | |
| DATED | : September 23, 2014 | |
| INVENTOR(S) | : David A. Fattal et al. | |

It is certified that error appears in the above-identified patent and that said Letters Patent is hereby corrected as shown below:

On the title page, item (75), Inventors, in column 1, line 2, delete "Beausoieil," and insert -- Beausoleil, --, therefor.

Signed and Sealed this
Third Day of March, 2015

Michelle K. Lee
*Deputy Director of the United States Patent and Trademark Office*